(12) United States Patent
Nagata et al.

(10) Patent No.: US 8,286,353 B2
(45) Date of Patent: Oct. 16, 2012

(54) METHOD OF MANUFACTURING THE OUTER RETAINER OF A ONE WAY CLUTCH THAT INCLUDES WINDOWS, BY PLACING THE OUTER RETAINER INTO A DIE AND PUNCHING OUT SLITS IN THE OUTER RETAINER USING A THIN PUNCH

(75) Inventors: Toshio Nagata, Iwata (JP); Hiroki Segawa, Fukuroi (JP); Hideki Oki, Omaezaki (JP); Seiji Nishimura, Iwata (JP)

(73) Assignee: NSK-Warner K.K., Tokyo (JP)

( * ) Notice: Subject to any disclaimer, the term of this patent is extended or adjusted under 35 U.S.C. 154(b) by 1074 days.

(21) Appl. No.: 12/176,453

(22) Filed: Jul. 21, 2008

(65) Prior Publication Data

US 2009/0019686 A1 Jan. 22, 2009

(30) Foreign Application Priority Data

Jul. 19, 2007 (JP) ................................. 2007-188554
Jun. 16, 2008 (JP) ................................. 2008-156974

(51) Int. Cl.
*B26F 1/12* (2006.01)
*B26D 1/06* (2006.01)

(52) U.S. Cl. ......... 29/898.067; 29/898.056; 29/898.054; 29/34 R; 83/917; 83/684; 72/333; 192/41 A (58) Field of Classification Search ............. 29/898.054, 29/898.056, 898.057, 898.065, 898.067; 192/41 A, 45.1; 72/326, 327, 333, 379.2; 83/917, 684–691

See application file for complete search history.

(56) References Cited

U.S. PATENT DOCUMENTS

| 1,854,516 | A | * | 4/1932 | Kirchner | 83/387 |
| 2,630,896 | A | * | 3/1953 | Dodge | 192/45.1 |
| 2,832,450 | A | * | 4/1958 | Wade | 192/45.1 |
| 2,856,045 | A | * | 10/1958 | Ferris | 192/45.1 |
| 2,966,246 | A | * | 12/1960 | Dodge | 192/45.1 |
| 3,207,278 | A | * | 9/1965 | Titt | 192/45.1 |
| 3,273,438 | A | * | 9/1966 | Brook | 83/685 |
| 3,455,196 | A | * | 7/1969 | Kreider | 83/454 |
| 3,499,200 | A | * | 3/1970 | Wilson | 29/898.067 |

(Continued)

FOREIGN PATENT DOCUMENTS

JP 63-115637 U 7/1988

(Continued)

OTHER PUBLICATIONS

Office Action issued on Jun. 19, 2012 in Japanese Patent Application No. 2008-156974.

*Primary Examiner* — David Bryant
*Assistant Examiner* — Jason L Vaughan
(74) *Attorney, Agent, or Firm* — Miles & Stockbridge P.C.

(57) ABSTRACT

A method of manufacturing an outer retainer for a one-way clutch having an outward flange at one side edge thereof involves punching out a part of an annular portion having the outward flange by sliding a punch toward an axis of the outer retainer substantially in an axially inner direction from a retainer outer periphery-sided curve portion of the outward flange to a retainer inner periphery-sided curve portion thereof in a way that uses a die and the punch.

6 Claims, 6 Drawing Sheets

U.S. PATENT DOCUMENTS

| | | | | |
|---|---|---|---|---|
| 3,942,616 A | * | 3/1976 | Elmore | 192/45 |
| 4,212,095 A | * | 7/1980 | Warchol | 29/898.067 |
| 4,322,878 A | * | 4/1982 | Warchol | 29/898.067 |
| 4,875,564 A | * | 10/1989 | Leitz et al. | 192/45.1 |
| 4,986,154 A | * | 1/1991 | Vernacchio | 83/54 |
| 5,000,303 A | * | 3/1991 | Shoji et al. | 192/45.1 |
| 5,038,903 A | * | 8/1991 | Akagi et al. | 192/41 A |
| 5,469,949 A | * | 11/1995 | Leitz | 192/45.1 |
| 5,480,013 A | * | 1/1996 | Fujiwara et al. | 192/45.1 |
| 5,598,737 A | * | 2/1997 | Oide | 72/453.01 |
| 5,842,548 A | * | 12/1998 | Sato et al. | 192/45.1 |
| 6,125,978 A | * | 10/2000 | Ando et al. | 192/41 A |
| 6,279,439 B1 | * | 8/2001 | Ikeda et al. | 83/39 |
| 6,591,955 B2 | * | 7/2003 | Calve | 192/45.1 |
| 6,932,206 B2 | * | 8/2005 | Miura et al. | 192/45.1 |
| 7,448,480 B2 | * | 11/2008 | Shirataki et al. | 192/41 A |

FOREIGN PATENT DOCUMENTS

| | | |
|---|---|---|
| JP | H7-71490 A | 3/1995 |
| JP | H11-336798 A | 12/1999 |
| WO | WO 2006/120730 | 11/2006 |

* cited by examiner

METHOD OF MANUFACTURING THE OUTER RETAINER OF A ONE WAY CLUTCH THAT INCLUDES WINDOWS, BY PLACING THE OUTER RETAINER INTO A DIE AND PUNCHING OUT SLITS IN THE OUTER RETAINER USING A THIN PUNCH

This application claims the benefit of Japanese Patent Applications No. 2007-188554 and No. 2008-156974 which are hereby incorporated by reference.

BACKGROUND OF THE INVENTION

1. Field of the Invention

The present invention relates to a method of manufacturing an outer retainer for a one-way clutch that is employed for an automatic transmission, a stator, etc of a vehicle.

2. Related Background Art

The automatic transmission etc of the vehicle involves using the one-way clutch that transmits rotary force on a driving side in one direction but does not transmit the rotary force in the opposite direction.

A conventional sprag type one-way clutch is constructed of an inner race and an outer race that are concentric and make relative rotations and of a one-way clutch mechanism interposed between the inner race and the outer race. The one-way clutch mechanism is built up by a plurality of sprags defined as torque transmitting members, a spring member that urges the sprags in an engaging direction, a cylindrical inner retainer and a cylindrical outer retainer which hold the sprags and restrain an excessive inclination thereof, and a pair of end bearings that ensure operations of the sprags by retaining these two retainers at a predetermined interval.

The outer retainer is constructed of two annular portions facing each other in an axial direction and a plurality of column members connecting these annular portions and provided at a predetermined interval in a peripheral direction. The outer retainer has a plurality of window portions configured by the column members neighboring each other and the two annular portions at a predetermined interval in the peripheral direction. Further, one annular portion is formed with an outward flange directed outward in a radial direction at an end on the opposite side to the other annular portion in the axial direction, i.e., at an end of one side of the outer retainer in the axial direction. The outward flange engages with an engagement groove formed in an inner peripheral face of the outer race, thereby positioning and supporting the outward flange with the outer race.

The inner retainer and the outer retainer have substantially the similar configuration, however, a flange formed at one end in the axial direction of the inner retainer is an inward flange directed inward in the radial direction.

In the thus-constructed one-way clutch, in the case of transmitting torque with the outer race serving as a driving race for applying rotary force to sprags, it is required to apply proper drag torque to between the outer retainer and the inner peripheral face of the outer race in order to surely transmit an operation to the sprags such as when an abrupt operation is applied to the outer race.

A known means for obtaining the drag torque is a means that forms a shaped portion called a T-bar or an i-bar in the outer retainer, gets the shaped portion deformed and thus brings the shaped portion into contact with the inner peripheral face of the outer race.

The T-bar is formed by a portion of the annular portion on the side of the outward flange cut away at two portions of the annular portion which define respectively the two window portions neighboring each other and the column member between the window portions neighboring each other. This T-bar forming means configures a T-bar defined as a T-shaped portion by the column member between the window portions neighboring each other and the divided outward flange-sided annular portion between the two cut-away portions. A plurality of thus-formed T-bars are provided at a predetermined interval, and the column members of these T-bars are bent outward in the radial direction by a predetermined quantity. In an assembled state, a scheme is that the outer retainer is held on the inner peripheral face of the outer retainer by dint of spring action of the T-bars, and the drag torque is obtained by bringing outer diametrical faces of the divided outward flanges of the plural T-bars into contact with the inner peripheral face of the outer race.

In another case, the outer retainer may be so structured that the outer diametrical faces of the divided outward flanges may engage with the engagement grooves formed in the inner peripheral face of the outer race, thus providing a mechanism for positioning the outer retainer and preventing a removal in the axial direction after being assembled. In this another structure, it is necessary to adopt a socalled i-bar structure in addition to the above T-bar structure.

The i-bar is defined as an i-shaped portion by cutting through a part of one column member, closer to the annular portion, between the neighboring window portions so as to separate the column member into two column pieces. A scheme is that a plurality of the thus-configured column members are provided at a predetermined interval, one of the separated column pieces is bent outward in the radial direction, the outer retainer is held on the inner peripheral face of the outer race by dint of spring action of these separated and bent column pieces, and these column pieces abut on the inner peripheral face of the outer race, thereby obtaining the drag torque.

Japanese Utility Model Laid-Open Publication No. 63-115637 discloses an outer retainer having a connected T-bar structure in which the T-bars are formed so as to be connected in the peripheral direction, and peripheral rigidity of the T-bar is thus improved.

The formation of the T-bar structure in the outer retainer entails, as described above, the process of cutting through a part of the annular portion on the side of the outward flange. The cutting means has hitherto adopted a method of cutting through a part of the annular portion on the side of the outward flange by a grinding stone.

Note that "Related Background Art" in the above has exemplified the T-bar, however, the operation of obtaining the drag torque is the same with a double connected T-bar in which a single window is provided between the cut-away portions or with a triple connected T-shaped bar in which two neighboring windows are provided between the cut-away portions.

Figure 5:
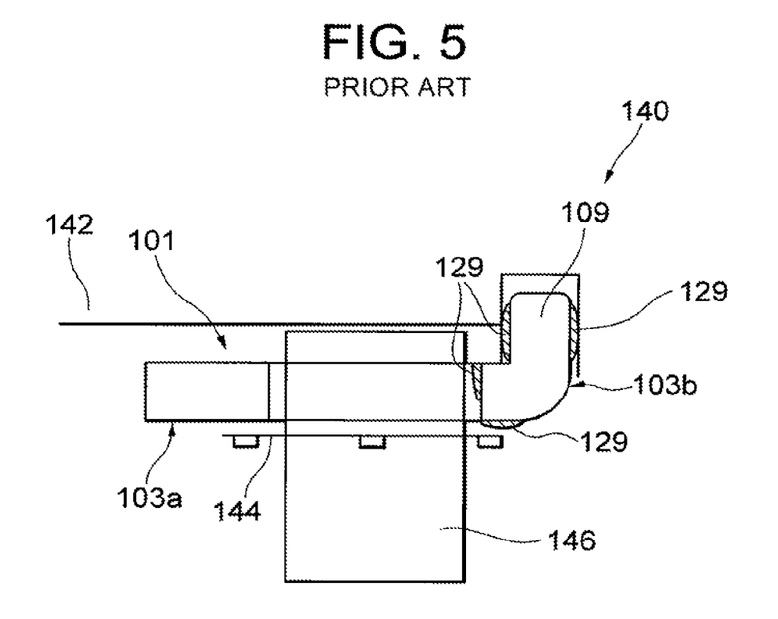
FIG. 5 is a view showing the position where the burr is predicted to occur in the outer retainer formed by a conventional working method.

In the case of the method of cutting through a part of the annular portion on the side of the outward flange by the grinding stone, however, as illustrated in FIG. 5, a burr 129 is produced in the cut-away portion even by cutting through an annular portion 103*b* on the side of an outward flange 109 in whichever direction. If the burr 129 remains produced in the cut-away portion, an outer retainer 101 does not fit to the inner peripheral face of an outer race 142 when assembled. Further, if the burr 129 exists in the inner peripheral direction of the outer retainer 101, the burr 129 interferes with a spring member 144, and a one-way clutch 140 undergoes a fault in operation. Accordingly, a process of removing the burr 129 is needed after the cutting process using the grinding stone in order to avoid the inconvenience described above.

SUMMARY OF THE INVENTION

It is an object of the present invention to provide a method of manufacturing an outer retainer for a one-way clutch, which is capable of minimizing occurrence of a burr and omitting a burr removing process.

To accomplish the above object, according to one aspect of the present invention, there is provided a method of manufacturing an outer retainer for a one-way clutch comprising: an outer diameter-sided member having an inner peripheral face; an inner diameter-sided member having an outer peripheral face facing in a radial direction the inner peripheral face; a plurality of torque transmitting members interposed between the inner peripheral face of the outer diameter-sided member and the outer peripheral face of the inner diameter-sided member and disposed in an inclinable manner between a position for transmitting torque by engaging with the inner and outer peripheral faces and a position in which to become a non-engagement state with the inner and outer peripheral faces; a spring member biasing the plurality of torque transmitting members in such a direction as to engage with the inner and outer peripheral faces; and an inner cylindrical retainer and an outer cylindrical retainer for holding the plurality of torque transmitting members at a predetermined interval in a circumferential direction and restraining an inclination thereof, the outer retainer being composed of a pair of annular portions facing each other in an axial direction and a plurality of column members disposed at a predetermined interval and connecting the pair of annular portions in the axial direction, a plurality of window portions being configured by faces, opposite to each other in a peripheral direction, of the column members neighboring each other and by faces, opposite to each other in the axial direction, of the pair of annular portions, one of the pair of annular portions having a radially outward flange at an end on the opposite side to the other annular portion in the axial direction, the outward flange abutting on the inner peripheral face of the outer diameter-sided member, the manufacturing method comprising a step of placing on a die a previously formed cylindrical outer retainer blank that includes said pair of annular portions, said plurality of column members and said outward flange so that a surface of said blank from said inner peripheral face, closer to said outward flange in the axial direction, of said outer retainer blank to an end face of said outward flange in the axial direction via said inner periphery-sided curve portion thereof, may be in contact with a supporting surface on the die; and a step of cutting through a part of the annular portion having the outward flange by sliding a punch having thin-plate blades toward an axial center of the outer retainer blank substantially in an axially inner direction from the outer periphery-sided curve portion of the outward flange to the inner periphery-sided curve portion.

Preferably, the punch is slid toward the axial center of the outer retainer blank substantially in the axially inner direction from the outer periphery-sided curve portion of the outward flange to the inner periphery-sided curve portion, thereby simultaneously punching out a plurality of parts of the annular portion having the outward flange.

More preferably, a shape of a bus of the surface, supporting the outer retainer blank, of the die conforms with a shape of a bus of the inner periphery-sided curve portion of the outward flange.

According to the present invention, even if the burr is produced in the cut-away portion, a burr-produced position is in the inner periphery-sided curve portion of the outward flange and in the vicinity thereof. A burr producing direction is a direction from the inner periphery-sided curve portion of the outward flange and from the vicinity thereof toward the opposite side to the outer periphery-sided curve portion of the outward flange and also toward the axial center substantially in the axial direction. The burr produced in this direction does not hinder a function of a one-way clutch mechanism, and this burr producing direction is an allowable direction. It is therefore feasible to omit the burr removing process after the cutting process and to reduce the number of processes.

Further, the conventional cutting process using a grinding stone is a technique of cutting portions to be formed with the cut-away portions on a one-by-one basis. By contrast, according to the present invention, all of the portions to be formed with the cut-away portions of the annular portion on the side of the outward flange can be worked at one time, and hence a period of processing time can be decreased. Moreover, the i-bar working can be done simultaneously with the cutting-away working of the annular portion on the side of the outward flange, thereby enabling the processes to be rationalized and the costs to be reduced.

DESCRIPTION OF THE PREFERRED EMBODIMENT

An embodiment of the present invention will hereinafter be described with reference to the drawings.

Figure 1:
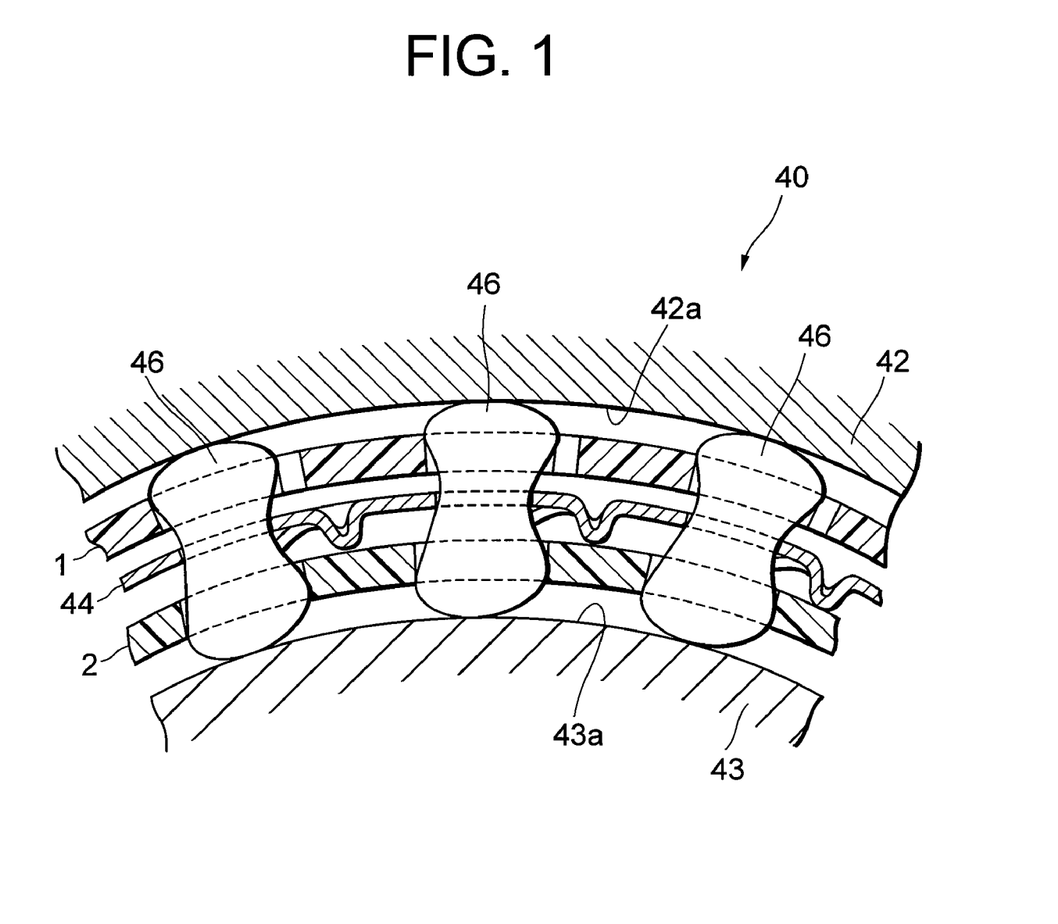
FIG. 1 is a sectional view showing, cut across an axial direction, principal portions of a one-way clutch including an outer retainer manufactured by a method of manufacturing the outer retainer for the one-way clutch according to the present embodiment.

FIG. 1 is a partial sectional view cut across an axial direction, showing principal portions of a one-way clutch including an outer retainer manufactured by a method of manufacturing an outer retainer for a one-way clutch according to the present invention.

A one-way clutch 40 includes an outer race 42, an inner race 43, sprags 46, a ribbon spring 44, an inner retainer 2 and an outer retainer 1. The outer race 42 is defined as an outer-diameter-sided member having an inner peripheral face 42a. The inner race 43 is defined as an inner-diameter-sided member having an outer peripheral face 43a that faces the inner peripheral face 42a in a radial direction. The sprags 46 are interposed between the inner peripheral face 42a of the outer race 42 and the outer peripheral face 43a of the inner race 43 and are disposed in an inclinable manner selectively to a position for transmitting torque while engaging with the inner and outer peripheral faces 42a, 43a and to a position in which to make a non-engagement with the inner and outer peripheral faces 42a, 43a. The ribbon spring 44 biases the plurality of sprags 46 in such directions as to engage with the inner and outer peripheral faces 42a, 43a. The inner retainer 2 and the outer retainer 1 each taking a cylindrical shape hold the plurality of sprags 46 at predetermined intervals in a circumferential direction and restrain inclinations thereof.

Figure 2A:
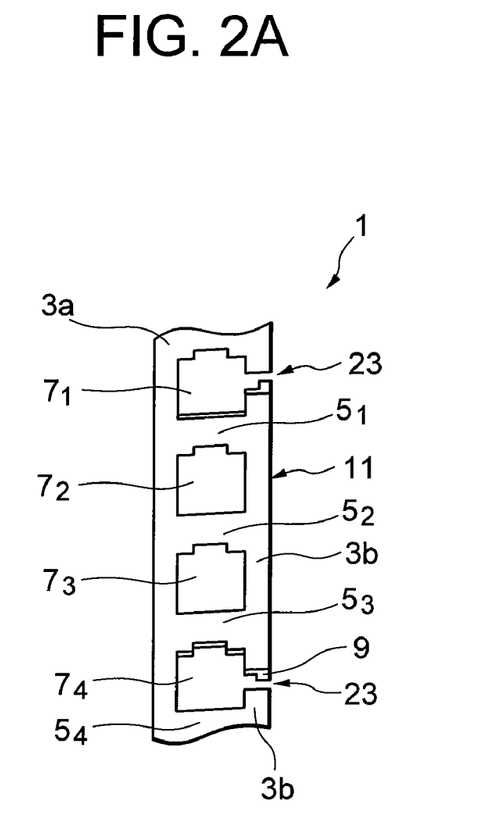
FIG. 2A is a view showing a part of the outer retainer manufactured by the method of manufacturing the outer retainer for the one-way clutch according to the present embodiment.

FIG. 2A is a view showing a part of the outer retainer 1 for the one-way clutch 40, viewed from the center thereof.

The outer retainer 1 is constructed of two annular portions 3a and 3b facing each other in the axial direction and a plurality of column members $5_1, 5_2, \ldots, 5_n$ (n is an integer, and the same representation is applied to the following) that connects these annular portions 3a and 3b and is provided at a predetermined interval in the peripheral direction. A plurality of window portions $7_1, 7_2, \ldots, 7_n$ is configured in the peripheral direction by faces, opposite to each other in the peripheral direction, of the neighboring column members 5 and by faces, opposite to each other in the axial direction, of the two annular portions 3a and 3b. The sprags 46 serving as the torque transmitting members are fitted in one-to-one correspondence into the plurality of window portions $7_1, 7_2, \ldots, 7_n$. The sprags 46 are held in the inclinable manner within a predetermined range by these window portions $7_1, 7_2, \ldots, 7_n$.

One 3b of the annular portions 3a and 3b building up the outer retainer 1 is formed with an outward flange 9 directed outward in the radial direction at a side end on the opposite side to the other annular portion 3a in the axial direction, i.e., at one-sided end of the outer retainer 1 in the axial direction.

The outer retainer 1 is provided with a triple connected T-shaped bar 11 serving to obtain a predetermined drag torque between the outer retainer 1 and the inner peripheral face 42a of the outer race of the one-way clutch 40 or serving as a removal preventive means for preventing a removal after being assembled to the outer race 42. The annular portion 3b is formed with the cut-away portions 23, 23 at portions which respectively define the window portions $7_1$ and $7_4$ between which the window portions $7_2$ and $7_3$ neighboring each other are interposed. The triple connected T-shaped bar 11 is composed of a portion of the annular portion 3b between the cut-away portions 23 and 23, and the column members $5_1, 5_2, 5_3$ that connect the annular portion 3b and the annular portion 3a between these two cut-away portions 23. A plurality of triple connected T-shaped bars 11 are formed at a predetermined interval in the outer retainer 1.

The triple connected T-shaped bar 11 is thus formed according to the present embodiment. The same operation as the triple connected T-shaped bar 11 has, is attained by, for example, forming cut-away portions 23, 23 respectively so that a T-shaped bar is constructed of a portion of the annular portion 3b between the two cut-away portions 23,23 formed by cutting through two portions of the annular portion 3b which respectively define the window portions $7_1$ and $7_2$ neighboring each other and the column member $5_1$ formed between the window portions $7_1$ and $7_2$.

According to the present embodiment, a method of forming the cut-away portions 23 by which some areas of the annular portion 3b are cut through so as to separate the annular portion 3b, involves using a press working method.

Figure 2B:
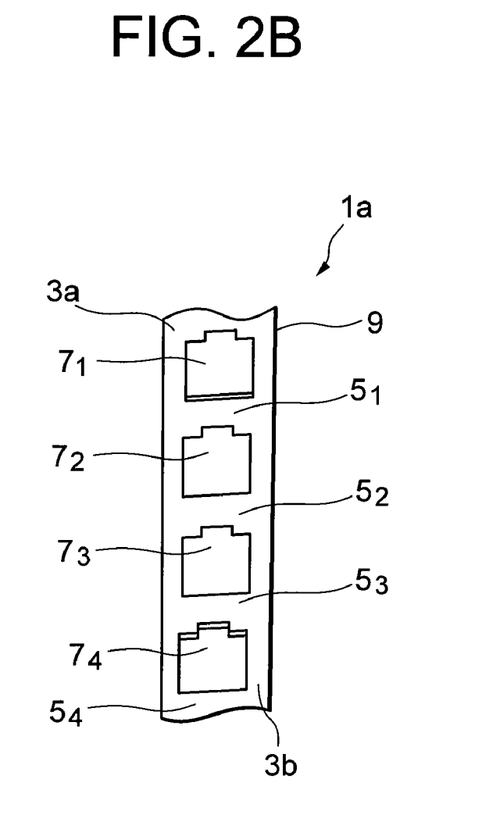
FIG. 2B is a view showing a part of an outer retainer blank formed in advance of the method of manufacturing the outer retainer for the one-way clutch according to the present embodiment.

In advance of carrying out the outer retainer manufacturing method according to the present embodiment, a cylindrical outer retainer blank 1a is formed as a blank to be formed as the outer retainer 1. The cylindrical outer retainer blank 1a is constructed of the pair of annular portions 3a and 3b facing each other in the axial direction and the plurality of column members 5 provided at the predetermined interval in the peripheral direction that connect the pair of annular portions 3a and 3b in the axial direction, in which a portion serving as the flange 9 directed outward in the radial direction is bent at an end, opposite to the other annular portion 3a in the axial direction, of one annular portion 3b.

FIG. 2B is a view showing a part of the outer retainer blank 1a. The outer retainer 1 is formed by the manufacturing method according to the present embodiment in a way that uses this outer retainer blank 1a.

Figure 3:
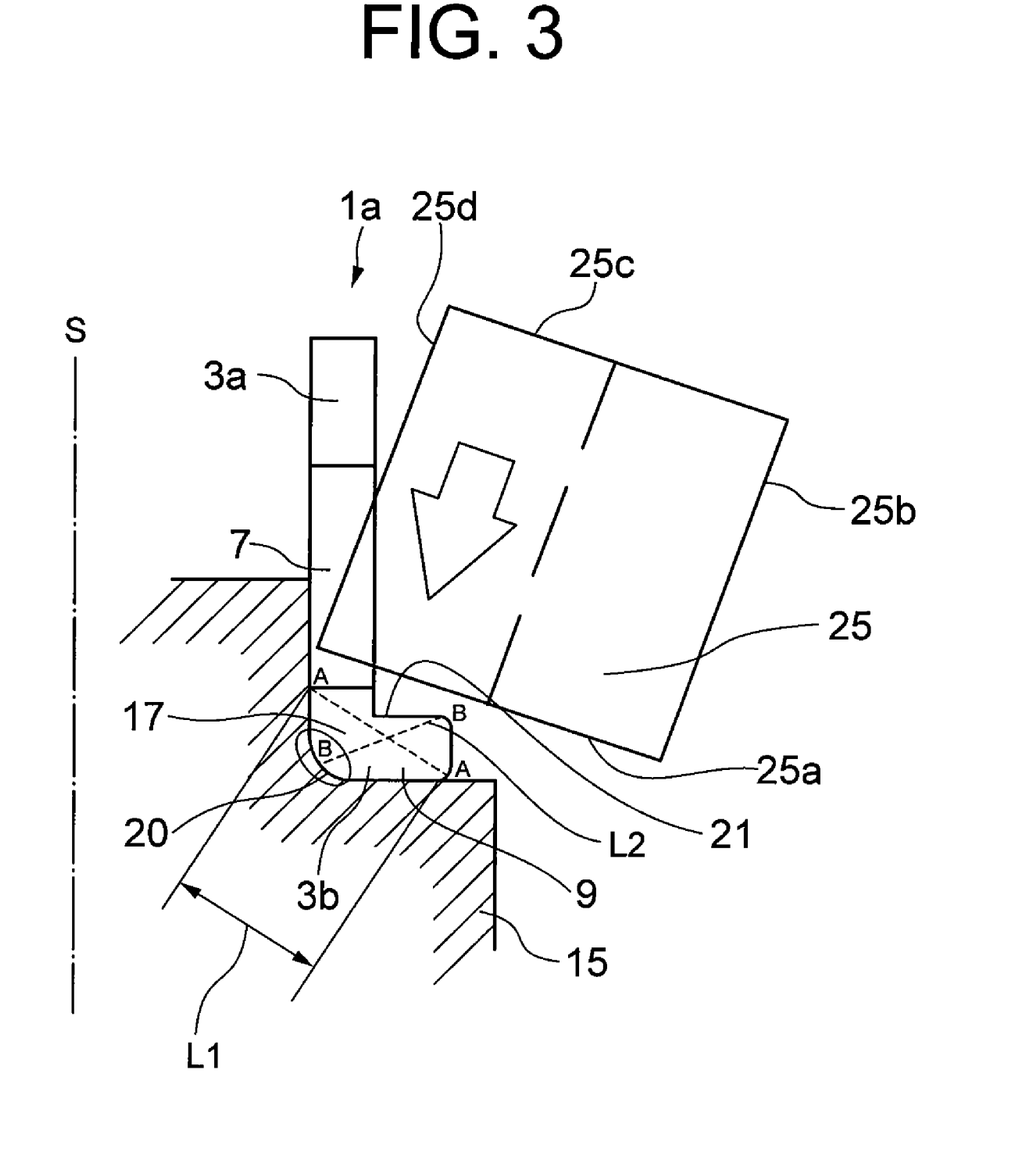
FIG. 3 is a schematic view of the manufacturing method for forming the outer retainer for the one-way clutch by use of the outer retainer blank according to the present embodiment.

FIG. 3 is a schematic view showing the manufacturing method according to the present embodiment, by which the outer retainer 1 for the one-way clutch is formed in a way that employs the outer retainer blank 1a. In FIG. 3, a shape of a bus of a surface, supporting the outer retainer blank 1a, of a die 15 used in the present embodiment is the same as a shape of a bus formed on the inner periphery-sided curve portion 20 of a bent portion 17 of the outward flange 9. The outer retainer blank 1a is placed on the die 15 so that an entire surface extending from the inner peripheral face close to the outward flange in the axial direction to the end face of the outward flange 9 via the inner periphery-sided curved portion 20 abuts on the supporting face of the die 15 in a face-to-face relation.

Given next is an explanation of a method of how areas to be formed with the cut-away portions 23 of the outer retainer blank 1a are punched by a punch 25.

The punch 25 takes a square or rectangular shape and is made of a material having hardness enabling the outer retainer blank 1a to be punched out. The respective sides of the punch 25 are formed with thin-plate blades 25a, 25b, 25c, 25d each extending over an entire length of each side. A dimension of one side of the punch 25 is set larger than a distance dimension L1 (which is a dimension of an A-A distance depicted by a broken line in FIG. 3) that connects an edge A of the annular portion 3b on the side of the window portion 7 and on the inner peripheral side of the annular portion 3b to an edge A of the annular portion 3b on the axial end face side of the outward flange 9 and on the outer diameter side end face of the outward flange 9. Further, a blade height of each of the thin-plate blades 25a, 25b, 25c, 25d is set larger than a distance dimension L2 (which is a dimension of a B-B distance depicted by a broken line in FIG. 3) that connects the end, on the side of the annular portion 3a, of the outer diameter-sided end face of the outward flange 9 to the inner periphery-sided curve portion 20.

The punch 25 is disposed in a position on an outer side in the radial direction of the annular portion 3a of the outer retainer blank 1a placed on the die 15. In this case, the blade 25a is disposed, in a radial direction about an axis S of the outer retainer blank 1a, to oppose the annular portion 3b close to the inside thereof substantially in the axial direction.

Then, the punch 25 is slid from the position given above toward the inside in the radial direction of the annular portion 3b and also toward (in an arrow-direction in FIG. 3) the axis S substantially inside in the axial direction. The punch 25 is thus slid in the oblique direction, and hence a part of the blade 25a on the side of the outer retainer blank 1a enters the window portion 7 from the annular portion 3a on the outer peripheral side of the window portion 7. Then, the part of blade 25a passes through the window portion 7 toward the annular portion 3b on the inner peripheral side of the window portion 7 and reaches the annular portion 3b on the side of the outward flange 9. Other areas of the blade 25a do not pass through the window portion 7 but reach the annular portion 3b. Then, the punch 25 is further slid in the same direction, thus punching out the annular portion 3b on the side of the outward flange 9 toward the axis S substantially in the axially inner direction from the outer periphery-sided curved portion 21 to the inner periphery-sided curved portion 20. The dimension of one side of the punch 25 is, as described above, set larger than the distance dimension L1 between the predetermined positions of the annular portion 3b, and the blade height of the blade 25a is likewise set larger than the distance dimension L2 between the predetermined positions of the annular portion 3b. Therefore, the punch 25 can surely punch out the annular portion 3b.

Thus, the annular portion 3b on the side of the outward flange 9 is separated in the peripheral direction, and the cut-away portion 23 is formed.

When the punch 25 punches out the annular portion 3b, a burr of the material of the punched-out annular portion 3b is easy to occur at an outlet formed therethrough by the punch 25 which has penetrated the annular portion 3b. In the present embodiment, however, the shape of the bus of the surface supporting the outer retainer blank 1a of the die 15 is coincident with the shape of the bent portion 17 of the outward flange 9 that is formed in the outer retainer blank 1a, i.e., coincident with the shape of the inner periphery-sided curved portion 20 of the bent portion 17. The outer retainer blank 1a is placed on the die 15 so that the inner periphery-sided curved portion 20 abuts in the face-to-face relation on the face taking the same bus shape formed in the die 15. Accordingly, the material of the annular portion 3b, which has been punched out by the punch 25, neither stays in the periphery of the outlet formed by the punch 25 nor produces the burr, but is discharged from a passage route of the punch 25. It is therefore feasible to restrain the burr from being produced and to, even if the burr occurs, minimize the burr.

Further, even when the burr 29 occurs at the outlet through which the punch 25 has punched out the annular portion 3b, this outlet extends over the inner periphery-sided curve portion 20 to the vicinity thereof (which is an area encircled by an ellipse in FIG. 3), and a direction in which the burr is formed is a direction toward the axis S substantially in the axial direction from the inner periphery-sided curved portion 21 that is opposite to the outer periphery-sided curved portion 20.

Figure 4:
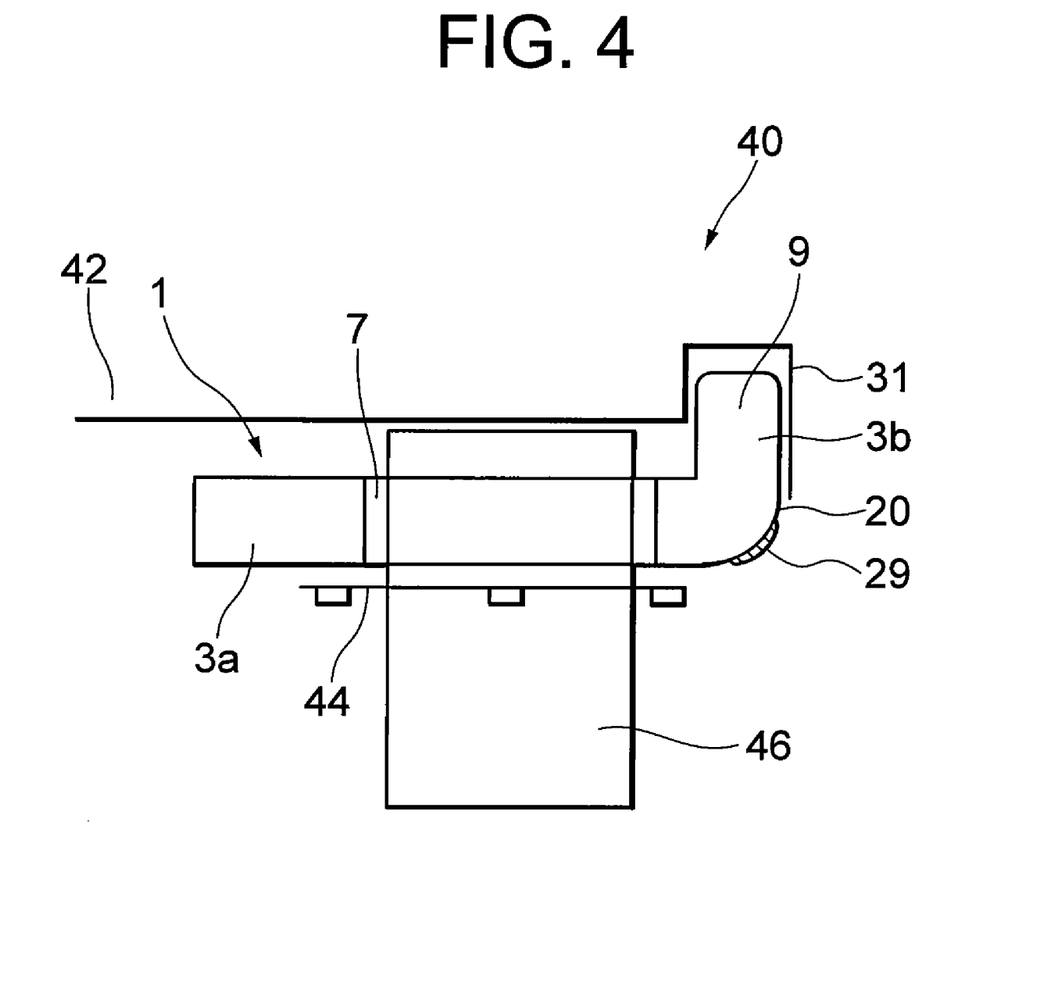
FIG. 4 is a view showing a position where a burr is predicted to occur in the outer retainer formed by the method of manufacturing the outer retainer for the one-way clutch according to the present embodiment.

Even when the burr is formed at the inner periphery-sided curved portion 20 and the vicinity thereof, the burr formed at this portion in the direction described above affects neither the assembly of the thus formed post-forming outer retainer 1 to the one-way clutch nor the function of the one-way clutch after being assembled. Namely, as illustrated in FIG. 4, in the case of assembling the thus formed outer retainer 1 to the one-way clutch 40, for example, a burr 29 does not hinder the assembling as in such a case that the outward flange 9 of the outer retainer 1 does not fit in an engagement groove 31 formed in the outer race 42 due to an existence of the burr 29. Further, even after being assembled, the position at which the burr 29 is formed is not such a position as to interfere with the ribbon spring 44 and the sprag 46 does not inhibit the operation of the one-way clutch 40.

Accordingly, even when the burr 29 is formed at the inner periphery-sided curve portion 20 and the vicinity thereof, a quantity of the burr 29 can be minimized, and the formed burr 29 is in neither such a position nor such a direction as to affect the assembly of the one-way clutch 40 and the post-assembling function. Hence, there is no necessity for an operation of removing the burr after the cutting-away process, thereby enabling the number of processes to be reduced.

The plurality of triple connected T-shaped bars 11 formed in the outer retainer 1 are provided at the predetermined interval. In the present embodiment, however, the press working described above is conducted by one operation with respect to each portion formed with the triple connected T-shaped bar 11 of the outer retainer blank 1a.

Figure 6:
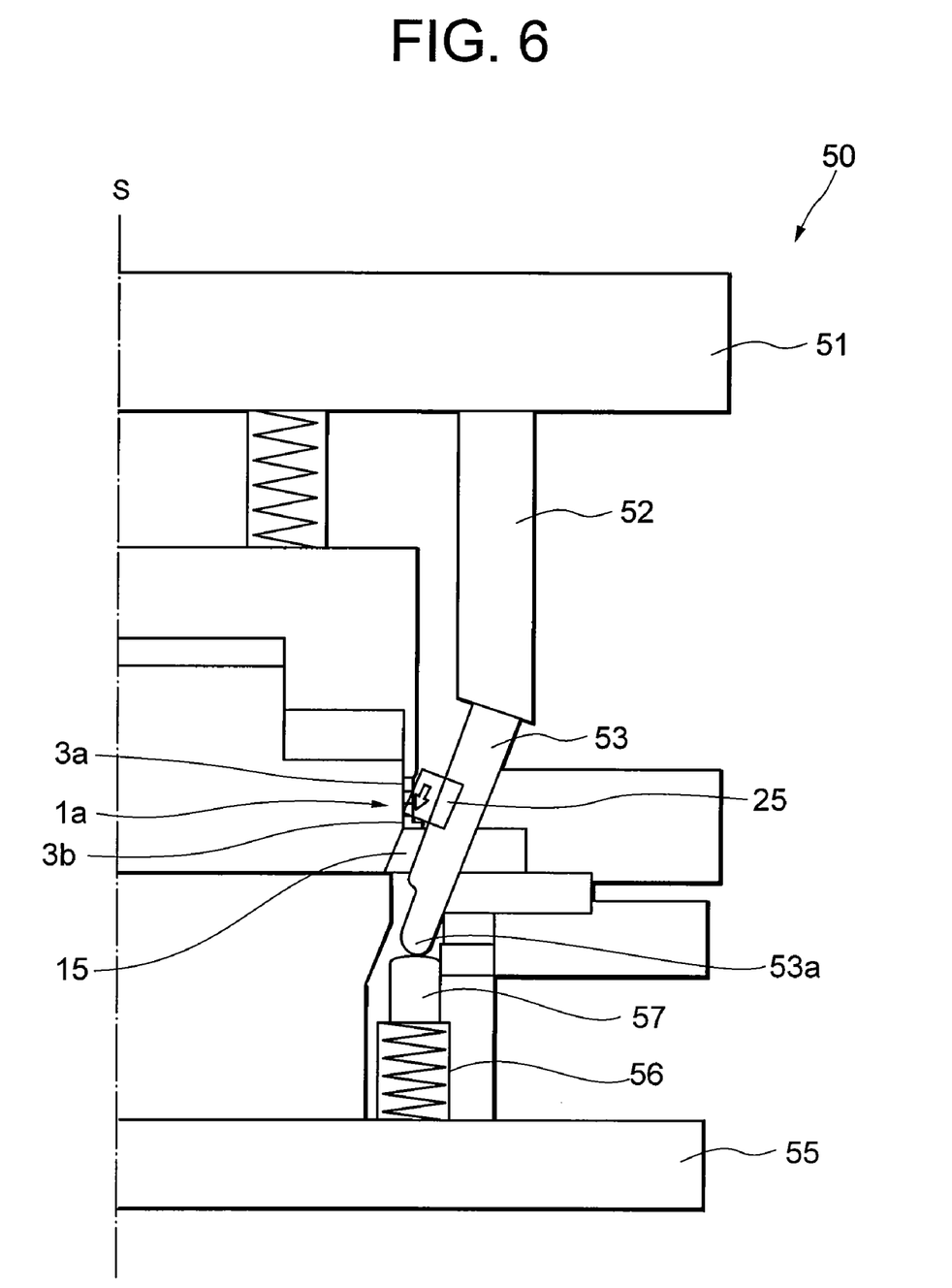
FIG. 6 is a schematic view showing a press working apparatus employed for forming the outer retainer according to the present embodiment.

FIG. 6 is a schematic view of the press working apparatus used for forming the outer retainer 1.

The outer retainer blank 1a is placed with the outward flange-sided annular portion 3b being downside on the die 15 of a press working apparatus 50. A lower surface of a top plate 51 of the press working apparatus 50 is provided with a support portion 52 extending downward, integrally with the top plate 51. The support portion 52 extends to the vicinity of upper part of the annular portion 3a outwardly of the outer peripheral face of the outer retainer blank 1a placed on the die 15. An end face of the support portion 52 on the lower side is an inclined face inclined in such a direction as to become farther from the axis S as it gets downward.

An arm 53 extends downward from the lower part of the support portion 52. An upper end face of the arm 53 abuts on the lower end face of the support portion 52 in a face-to-face relation. To be specific, the arm 53 is provided vertically to the inclined lower end face of the support portion 52. Therefore, the arm 53 is inclined at a predetermined angle toward the axis S in such a direction as to shorten the distance from the axis S as it gets downward. The upper end face of the arm 53 and the lower end face of the support portion 52 are brought into contact with each other slidably in such a direction as to shorten or enlarge a distance between the arm 53 and the axis S. The arm 53 extends down more than the lower part of the outer retainer blank 1a placed on the die 15, and a lower end of the arm 53 is formed in a semi-spherical shape.

An inner peripheral part of the arm 53 faces in the radial direction an outer peripheral part of the outer retainer blank 1a placed on the die 15. The punch 25 is secured to the inner peripheral part of the arm 53. The punch 25 is secured so as to be positioned on the outside in the radial direction of the outer retainer blank 1a placed on the die 15.

An upper face of a seat portion 55 of the press working apparatus 50 is provided with an arm receiving member 57 movable in up-and-down directions through a spring member 56. An upper end face of the arm receiving member 57 slidably abuts on a semi-spherical portion 53a formed at the lower end of the arm 53. The press working apparatus 50 is provided with the plurality of these arms 53 at a predetermined angular interval.

The top plate 51 is movable up and down. When the top plate 51 moves downward, the plurality of arms 53 provided on the support portion 52 moves downward simultaneously together with the top plate 51. In this case, an upper end face of the arm 53, simultaneously with the downward movement, slides on the inclined lower end face of the support portion 52. Specifically, the arm 53 is pressed downward by the support portion 52, whereby the upper end face of the arm 53 slides on the lower end face of the support portion 52 in such a direction as to decrease the distance from the axis S. Therefore, the arm 53 moves, while keeping the inclined angle to the axis S, downward in such a direction as to decrease the distance from the axis S. Simultaneously, the semi-spherical portion 53a provided at the lower end of the arm 53 presses downward the arm receiving member 57, and the arm receiving member 57 moves downward by this pressing force. At this time, the semi-spherical portion 53a provided at the end of the arm 53 slides on the upper end face of the arm receiving member 57 toward the axis S, depending on elasticity of the spring member 56 and an installation angle of the arm 53. Namely, the arm 53 moves downward, while the lower end of the arm 53 moves toward the axis S.

Thus, the upper end face of the arm 53 slides on the lower end face of the support portion 52 in such a direction as to shorten the distance from the axis S, and simultaneously the lower end (semi-spherical portion) 53a slides on the arm receiving member 57 in such a direction as to decrease the distance from the axis S. Hence, the arm 53 descends in such a direction as to reduce the distance from the axis S without changing the inclined angle thereof. The arm 53 thus moves, and therefore the punch 25 provided on the inner peripheral side of the arm 53 slides from a position radially outside of the annular portion 3a of the outer retainer blank 1a toward the interior of the annular portion 3b of the outer retainer blank 1a in the radial direction, i.e., toward the axis S (in the arrow-direction in FIG. 6) substantially in the axial direction and radially inwardly from the radially-outward position of the annular portion 3a of the outer retainer blank 1a placed on the die 15.

Thus, the punchs 25 simultaneously punch out a plurality of portions for forming the cut-away portions 23 of the annular portions 3b in inverse radial directions toward the axis S from the outer periphery side of the outer retainer blank 1a, whereby the annular portions 3b are simultaneously punched out.

Thus, the plurality of cut-away portions 23 can be simultaneously punched out by adopting the press working, thereby enabling the processing time to be reduced.

Moreover, the method of manufacturing the outer retainer for the one-way clutch according to the present invention involves adopting the press working and is therefore capable of working the annular portion on the side of the outward flange simultaneously with working the i-bar (unillustrated). Accordingly, the processes can be rationalized, and the costs can be reduced down.

Further, the direction in which the burr is formed at the inner periphery-sided curve portion of the outward flange and in the vicinity thereof can be controlled by adjusting the angle at which the punch punches out the annular portion formed with the outward flange. The control of the direction in which the burr is formed enables the burr to occur in such a direction as to minimize the influence of the formed burr upon the function of the one-way clutch, depending on the dimension and the configuration of the one-way clutch. A desirable angle at which the annular portion on the side of the outward flange is punched out in such a direction as not to affect the function of the one-way clutch is 45° through 70° with respect to the radial direction.

Note that the shape of the punch used in the present embodiment is, as described above, the square or the rectangle, wherein the respective sides are formed with the blades 25a, 25b, 25c, 25d. The punch 25 is formed in the square or rectangular shape, whereby if, e.g., the blade 25a is abraded, the blade 25b can be used by changing the fitting direction of the punch 25 to the press working apparatus. Thus, the working can be done with all of the four-directional blades by changing the fitting direction of the punch 25 to the press working apparatus, which leads to the reduction in costs for the punch.

What is claimed is:

1. A method of manufacturing a cylindrical outer retainer for a one-way clutch comprising:
    an outer diameter-sided member having an inner peripheral face;
    an inner diameter-sided member having an outer peripheral face that faces in a radial direction said inner peripheral face;
    a plurality of torque transmitting members interposed between said inner peripheral face of said outer diameter-sided member and said outer peripheral face of said inner diameter-sided member and disposed in an inclinable manner selectively between a position for transmitting torque by engaging with said inner and outer peripheral faces and a position for being in a non-engagement state with said inner and outer peripheral faces;
    a spring member for biasing said plurality of torque transmitting members in such a direction as to engage with said inner and outer peripheral faces; and
    a cylindrical inner retainer and a cylindrical outer retainer holding said plurality of torque transmitting members at a predetermined interval in a circumferential direction and restraining an inclination thereof,
    said manufacturing method comprising:
    a step of placing on a die a previously formed cylindrical outer retainer blank that includes a pair of first and second annular portions facing each other in an axial direction, a plurality of column members disposed at a predetermined interval and connecting said pair of first and second annular portions in the axial direction, a plurality of window portions being configured by faces, opposite to each other in a peripheral direction, of neighboring ones of said plurality of column members and by faces, opposite to each other in the axial direction, of said pair of first and second annular portions, the first annular portion being formed with a radially outward flange at a side edge on a side opposite the second annular portion in the axial direction through an inner periphery-sided curve portion thereof, so that a radially inner surface of the first annular portion of said retainer blank, a surface of said inner periphery-sided curve portion, and a radially extended surface of the outward flange are in contact with a supporting surface of the die; and
    a step of cutting through a part of said first annular portion by sliding a punch having a thin-plate blade, from a radially outer side of said second annular portion through one of said plurality of window portions, in a direction having a component that is radially inward of the outer retainer blank and a component that is axial from the second annular portion to the first annular portion.

2. A method of manufacturing a cylindrical outer retainer for a one-way clutch according to claim 1,
    wherein said supporting surface of said die conforms with said radially inner surface of the first annular portion, said surface of said inner periphery-sided curve portion, and said radially extended surface of the outward flange.

3. A method of manufacturing a cylindrical outer retainer for a one-way clutch according to claim 2,
    wherein said surface of said inner periphery-sided curve portion is continuous to said radially inner surface of the first annular portion.

4. A method of manufacturing a cylindrical outer retainer for a one-way clutch according to claim 3,
    wherein said radially extended surface of the outward flange is continuous to said surface of said inner periphery-sided curve portion.

5. A method of manufacturing a cylindrical outer retainer for a one-way clutch according to claim 1,
    wherein said surface of said inner periphery-sided curve portion is continuous to said radially inner surface of the first annular portion.

6. A method of manufacturing a cylindrical outer retainer for a one-way clutch according to claim 5,
    wherein said radially extended surface of the outward flange is continuous to said surface of said inner periphery-sided curve portion.

* * * * *